United States Patent [19]
Yamada

[11] 3,843,194
[45] Oct. 22, 1974

[54] VEHICLE BODY COWL
[75] Inventor: Kazuo Yamada, Tokyo, Japan
[73] Assignee: Nissan Motor Company, Limited, Yokohama, Japan
[22] Filed: Nov. 17, 1972
[21] Appl. No.: 307,391

[30] Foreign Application Priority Data
Nov. 17, 1971 Japan.............................. 46-107584

[52] U.S. Cl.............................. 296/84 R, 15/250.16
[51] Int. Cl............................. B60j 1/02, B60s 1/04
[58] Field of Search.............. 296/84 R, 28 G, 28 R; 15/250.16, 250.17, 250.5; 98/2.16, 2.17

[56] References Cited
UNITED STATES PATENTS
3,120,673   2/1964   Buchwald ........................ 15/250.17

FOREIGN PATENTS OR APPLICATIONS
1,138,106   1/1957   France............................. 15/250.16
789,571    1/1958   Great Britain .................... 296/84 R

*Primary Examiner*—David Schonberg
*Assistant Examiner*—John A. Pekar

[57] ABSTRACT

A body for a vehicle having a cowl structure formed with a transversely extending well therein which is disposed forwardly and beneath the lower edge of a windshield and which has an access opening. A cowl top grill is located in the well to minimize the effective area of the access opening of the well for thereby efficiently remove the snow and rain outside of the vehicle from the windshield.

2 Claims, 7 Drawing Figures 3,843,194

VEHICLE BODY COWL

This invention relates in general to arrangements of windshield wipers in motor vehicles and, more particularly, to a construction of a vehicle covering or cowl in combination with the windshield wipers.

A primary object of the present invention is to provide an arrangement to remove efficiently the rain and snow from the windshield of a motor vehicle.

Another object of the present invention is to provide a windshield wiper which permits removal of rain and snow from a vehicle covering or cowl.

Another object of the present invention is to provide a windshield wiper arrangement which improves the vision in vehicles.

A further object of the present invention is to provide a body for a vehicle having a cowl structure combined with windshield wipers of the vehicle.

A further object of the present invention is to provide a vehicle body having a covering or cowl structure and windshield wipers, which vehicle body is adapted to prevent snow accumulation on the vehicle covering near the windshield of a motor vehicle.

A still further object of the present invention is to provide a vehicle body having a covering or cowl structure and windshield wipers, which vehicle body is adapted to prevent the operation of the windshield wipers from being hampered by snow that would accumulate on the vehicle covering near the windshield of the vehicle during winter.

A yet further object of the present invention is to provide a vehicle body having a covering or cowl structure and windshield wipers which vehicle body satisfactorily remove rain and snow from the vehicle covering near the windshield of the vehicle thereby improving the vision in the vehicle when it is running.

A yet further object of the present invention is to provide vehicle body having a covering or cowl structure and windshield wipers which vehicle body is simplified in construction.

The other objects and advantages of the present invention will become more apparent from the following description when taken in conjunction with the accompanying drawings in which like or corresponding component parts are designated by same reference numerals and in which.

Figure 1:
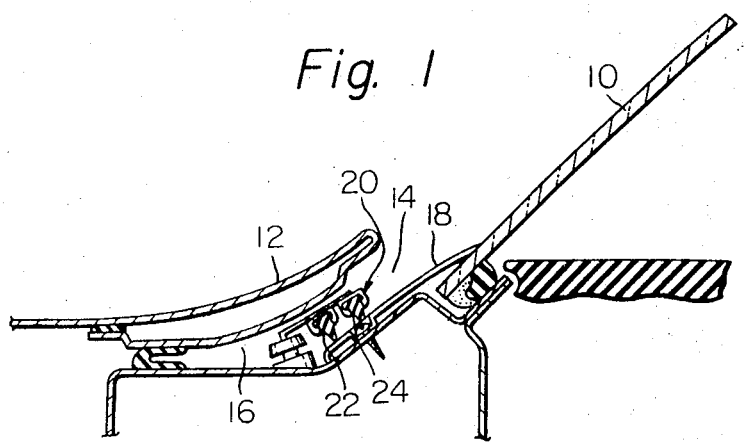
FIG. 1 is a fragmentary cros sectional view of a conventional construction of a vehicle covering or body in combination with windshield wipers.

Referring now to FIG. 1, there is shown a portion of a vehicle which is conventionally arranged and constructed. The vehicle has, as customary, a rearwardly inclined windshield 10 having substantial curvature in horizontal section. The vehicle also has a forwardly extending vehicle covering or cowl structure 12 having an opening 14. The opening 14 and the cowl structure 12 provide access to a well 16 disposed forwardly and beneath the lower edge of the windshield 10. The rear wall of the well 16 is constituted by a curved ramp 18 which guides and supports the wiper blades during movements between their operating and parked, or stowed, positions. A windshield wiper mechanism, which is generally indicated by reference numeral 20, is mounted in the well 16 and adapted to be concealed therein as shown in FIG. 1 when the windshield cleaning mechanism is not in use. With such an arrangement, if the windshield wiper mechanism is operated during snow-fall, the snow wiped from the windshield 10 tends to be forced in the well 16 through the opening 14 and accumulates above the opening 14 or on front of the windshield 10 thereby impairing the vision of the driver. Moreover, the snow which accumulates in the well 16 may freeze during winter so that the operation of the windshield wiper mechanism is hampered and, accordingly, the windshield wiper mechanism will finally cease to operate.

Figure 2:
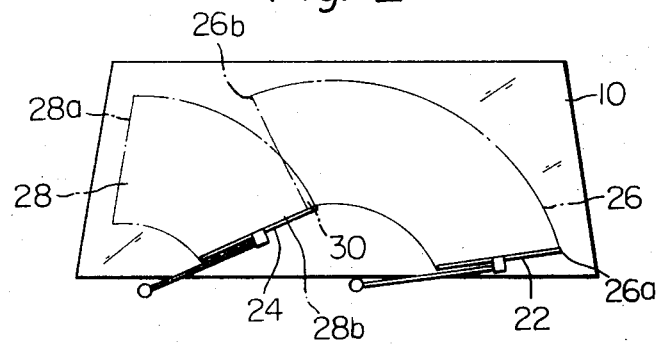
FIG. 2 is a view illustrating wiped patterns of the windshield wipers shown in FIG. 1.
Figure 3:
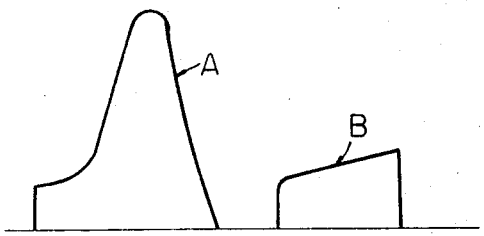
FIG. 3 is a graph showing the amounts of snow to be removed from the window pane to the vehicle covering by each windshield wiper shown in FIG. 1.

As seen in FIG. 2, the wiper blades 22 and 24 are movable throughout wiping paths 26 and 28, respectively, across the outer surface of the windshield 10 the paths of the wiper blades overlapping in the area 30 at the central portion of the windshield 10. During operation of the windshield wiper mechanism 20, the wiper blade 22 is movable throughout running stroke having an outboard limit 26a and an inboard limit 26b so that during winter the snow is wiped by the wiper blade 22 out of the wiping path, or area 26. Similarly, the wiper blade 24 is movable throughout running stroke having an outboard limit 28a and an inboard limit 28b so that the snow is wiped thereby out of the wiping pattern, or area, 28. Under these circumstances, the wiper blade 22 forces out the snow on to the wiping area 28 of the wiper blade 24 and, thus, the amount of snow wiped by the wiper blade 24 is increased. In FIG. 3, a curve A indicates the amount of snow to be forced out of the wiping area 28 when the wiper blade 24 assumes the position shown in FIG. 2, namely, the inboard limit 28a, whereas a curve B indicates the amount of snow to be forced out of the wiping area 26 when the wiper blade 22 assumes the position shown in FIG. 2, namely, the outboard limit 26a.

The present invention is based upon the above fact and contemplates to mount a cowl top grill in the well formed in front of the windshield so as to minimize the opening of the well for thereby precluding entry of snow in the well and accumulation of the snow in the well.

A preferred embodiment of the vehicle body carrying out the above concept is illustrated in FIGS. 4 to 7.

Figure 4:
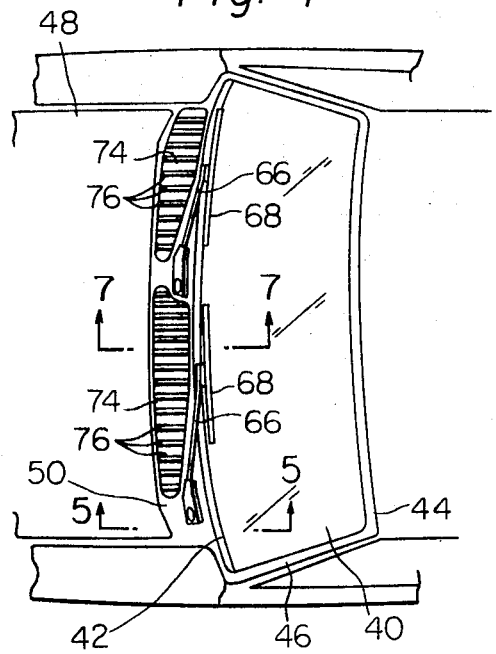
FIG. 4 is a fragmentary schematic view of a vehicle body according to the present invention.
Figure 5:
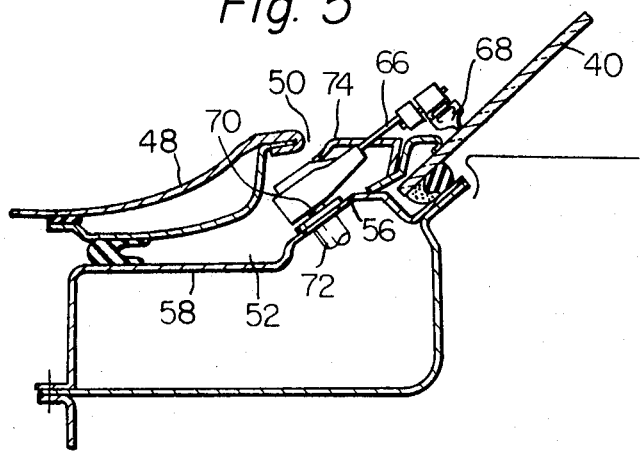
FIG. 5 is a fragmentary cross sectional view taken on line 5—5 of FIG. 4.
Figure 6:
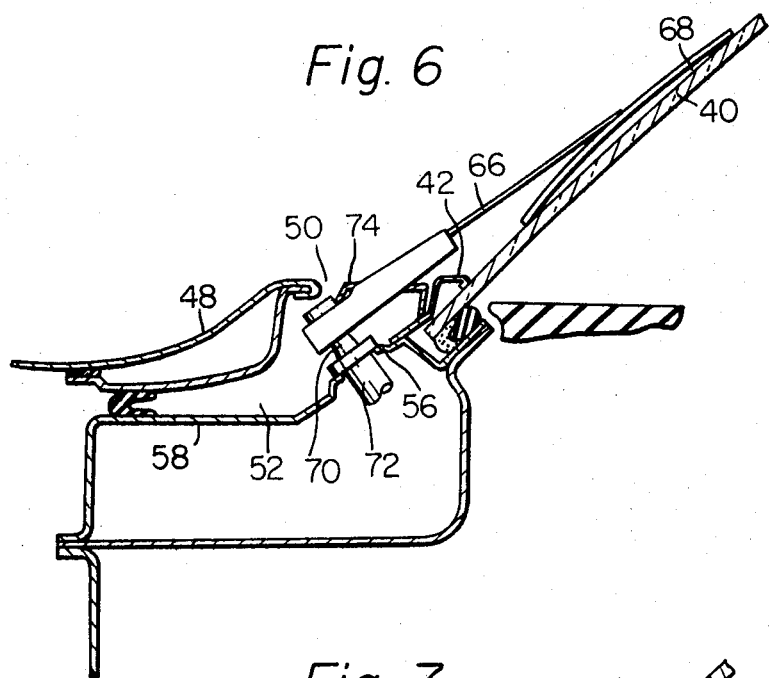
FIG. 6 is a view similar to FIG. 5 showing the windshield wiper in its operating position.
Figure 7:
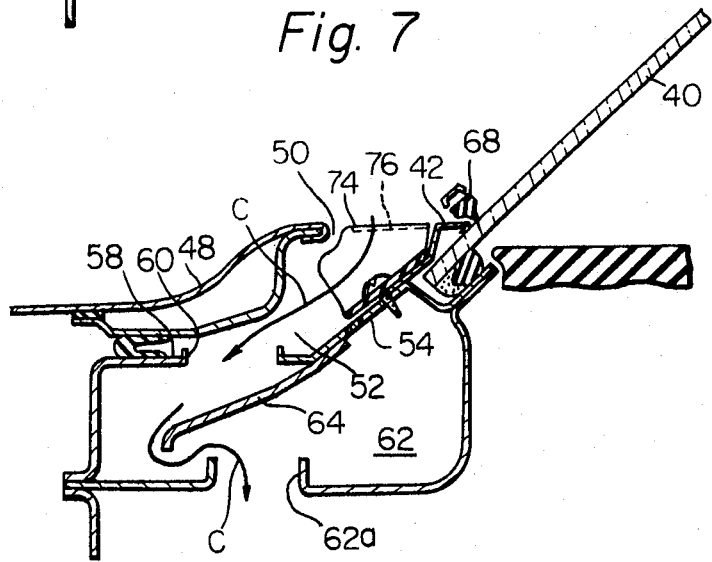
FIG. 7 is a fragmentary cross sectional view taken on line 7—7 of FIG. 4.

Referring now to FIGS. 4 through 7, a portion of a vehicle body is shown including a rearwardly inclined windshield 40 having a lower reveal molding 42, an upper, or header, reveal molding 44 and side pillers 46. As is customary, the vehicle also includes a forwardly extending vehicle covering or cowl structure 48 having an elongate transversely extending access opening 50. As best seen in FIGS. 5, 6 and 7 the cowl structure 48 is forwardly declined so that the snow wiped out from the windshield 40 is satisfactorily removed. The cowl structure 48 is formed with a well 52 disposed forwardly and beneath the lower edge of the windshield 40. The well 52 includes an upwardly inclined wall portion 54 and a pair of forwardly slightly projecting wall portions 56 formed at different positions for a purpose to be discussed in detail hereinafter.

As best seen in FIG. 7, the bottom wall 58 of the well 52 is formed with one or more holes 60 through which air is passed into an engine compartment (not shown) via a plenum chamber 62 having one or more apertures 62a. A trough member 64 is fastened to the upwardly inclined wall portion 54.

It is to be noted that the bottom wall 58 of the well 52 is preferably curved and slopes toward the outside of the vehicle whereby the rain or snow water which reaches the well 52 can flow off in the well 52 toward either side of the vehicle.

A windshield wiper mechanism, as seen in FIGS. 4, 5 and 6, comprises a pair of spaced wiper arms 66 which carry wiper blades 68 at their outer ends, the wiper blades 68 being of known construction and capable of conforming to surfaces of varying curvature as well as to substantially planar surfaces. As clearly shown in FIGS. 5 and 6, each wiper arm 66 is drivingly connected to an oscillatable pivot shaft 70 rotatably journalled in a casing 72 fixedly mounted on the wall portion 56 of the well 52. It is to be understood that the pivot shaftw 70 are connected by suitable drive mechanism to a wiper motor, not shown, for imparting oscillation thereto in phase opposition.

The wiper blades 68 of the windshield wiper mechanism thus constructed are movable throughout the elliptical wiping patterns across the outer surface of the windshield 40 in a manner as previously mentioned. However, when the windshield wiper mechanism is in rest or parked position, the wiper blades 68 substantially horizontally extend slightly above the lower reveal molding 42 or the lower edge of the windshield 40, as shown in FIGS. 4, 5 and 7, while the wiper arms 66 are inclined slightly upwardly as shown in FIGS. 4 and 5.

According to an important feature of the present invention, one or more cowl top grills 74 are located in the well 52 to reduce or minimize the opening area 50 of the well 52 thereby to preclude entry of the snow into the well 52. This construction will help to remove the snow from the windshield 40 more completely because of a reason to be subsequently described and, therefore, undesirable accumulation of the snow on the windshield 40 or on the cowl structure 48 in front of the windshield 40 can be satisfactorily prevented. The cowl top grills 74 are preferably configulated so as to allow the wiper arms 66 to be accommodated in the well 52 when the wiper blades 68 lies in their rest positions. As best seen in FIGS. 4 and 7, each cowl top grill 74 has formed therein a plurality of slots 76 communicating with the hold 60 for permitting air to pass therethrough into the engine compartment (not shown) in a direction of arrows C in FIG. 7. In the illustrated embodiment of FIG. 7, each of the cowl top grill 74 is detachably secured on the upwardly inclined wall portion 54 by a suitable fastening means such as a bolt.

With this arrangement, the wiper blades 68 forces out the snow from the windshield 40 on to the upper surfaces of the cowl top grills 74 and the snow is removed therefrom. Since, in this condition, the opening area 50 of the wall 52 is minimized by the cowl top grills 74, the snow is prevented from entering the well 52 so that the snow accumulation in front of the windshield 40 is satisfactorily avoided. The snow wiped by the wiper blades 68 is moved on to the cowl top grills 74 and, thence, the snow is forced toward the cowl structure 48. The snow which reaches the cowl structure 48 will then slides thereon toward the forward end of the vehicle and, thus, the snow is removed outside of the vehicle. In this manner, the vision of the driver will no longer be impaired by the snow accumulation. Also, the operation of the windshield wiper mechanism is not hampered by the snow. Furthermore, the wiper blades 68 lie on the lower edge of the windshield whereas other parts of the windshield mechanism is concealed in the well 52 when the windshield mechanism is not in use. In this manner, the vision of the driver will not be impaired when the windshield wiper mechanism is stopped.

While only one preferred embodiment of the present invention has been shown and described in detail, it is to be understood that the present invention is not limited thereto. Various modifications and changes may also be made in the design and arrangements of the component parts without departing from the scope of the present invention as the same now will be understood by those skilled in the art.

What is claimed is:

1. A body for a vehicle comprising, in combination, a rearwardly inclined windshield, a cowl structure having a transversely extending well therein disposed forwardly and beneath the lower edge of said windshield, said well having an access opening and including an upwardly inclined wall portion lying adjacent the lower edge of the windshield and a bottom wall portion and sloping downwardly toward the outside of said vehicle, said bottom wall portion of said well having formed therein a hole, an oscillatable pivot shaft disposed in said well and supported by said upwardly inclined wall portion of said well, a wiper arm drivingly connected to said pivot shaft within said well, a wiper blade carried by said wiper arm at an outer end of said wiper blade and movable between a substantially horizontal rest position and an operating position in engagement with said windshield, said wiper blade substantially horizontally extending slightly above the lower edge of said windshield when said wiper blade is pivoted to said rest position, and a cowl top grill detachably secured on said upwardly inclined wall portion of said well and reducing an effective area of said access opening.

2. A body for a vehicle according to claim 1, wherein said cowl top grill has formed therein a plurality of slots for passing air therethrough, said plurality of slots being in communication with said hole formed in said bottom wall portion of said well.

* * * * *